(12) United States Patent
Chai et al.

(10) Patent No.: US 9,042,607 B2
(45) Date of Patent: May 26, 2015

(54) SYSTEM AND METHOD FOR USER ACCESS OF DISPENSING UNIT

(75) Inventors: Andrew Chai, Mountain View, CA (US); Dan Cohen, Mountain View, CA (US); Joy Smith, Mountain View, CA (US); Michael Thieme, Mountain View, CA (US); Justin Metzger, Mountain View, CA (US); Jennifer Cartright, Mountain View, CA (US)

(73) Assignee: OMNICELL, INC., Mountain View, CA (US)

( * ) Notice: Subject to any disclaimer, the term of this patent is extended or adjusted under 35 U.S.C. 154(b) by 930 days.

(21) Appl. No.: 13/101,923

(22) Filed: May 5, 2011

(65) Prior Publication Data
US 2012/0283871 A1 Nov. 8, 2012

Related U.S. Application Data

(60) Provisional application No. 61/481,617, filed on May 2, 2011.

(51) Int. Cl.
  *G06K 9/00* (2006.01)
  *H04L 9/32* (2006.01)
  *G06F 21/32* (2013.01)

(52) U.S. Cl.
  CPC .............. *H04L 9/3231* (2013.01); *G06F 21/32* (2013.01)

(58) Field of Classification Search
  None
  See application file for complete search history.

(56) References Cited

U.S. PATENT DOCUMENTS

| | | | |
|---|---|---|---|
| 4,696,046 A | 9/1987 | Schiller | |
| 5,745,366 A | 4/1998 | Higham et al. | |
| 5,805,456 A | 9/1998 | Higham et al. | |
| 5,815,252 A * | 9/1998 | Price-Francis | 356/71 |
| 5,905,653 A | 5/1999 | Higham et al. | |
| 5,927,540 A | 7/1999 | Godlewski | |
| 6,011,999 A | 1/2000 | Holmes | |
| 6,039,467 A | 3/2000 | Holmes | |
| 6,272,394 B1 | 8/2001 | Lipps | |
| 6,333,989 B1 | 12/2001 | Borza | |
| 6,463,165 B1 * | 10/2002 | Ito | 382/124 |
| 6,609,047 B1 | 8/2003 | Lipps | |
| 6,640,159 B2 | 10/2003 | Holmes et al. | |
| 6,654,484 B2 * | 11/2003 | Topping | 382/124 |
| 6,760,643 B2 | 7/2004 | Lipps | |
| 6,766,040 B1 | 7/2004 | Catalano et al. | |

(Continued)

OTHER PUBLICATIONS

International Search Report and Written Opinion of PCT/US12/036151 mailed on Jul. 12, 2012, 40 pages.

(Continued)

*Primary Examiner* — Jayesh A Patel
(74) *Attorney, Agent, or Firm* — Kilpatrick Townsend & Stockton LLP

(57) ABSTRACT

Dispensing units for dispensing items, such as in a healthcare facility, are linked in a network. The dispensing units use a fingerprint to authenticate users. The fingerprints on a short list reflect recent authorization, and permit access without other identifying information. Dispensing units in the network may use different fingerprint scanning technologies, but are made compatible by enrolling fingerprints using the different technologies. Two or more reference fingerprints may be stored at a dispensing unit, permitting either a primary fingerprint or alternate fingerprint to gain access to that dispensing unit. During enrollment of a user, fingerprints for a user may be "fast tracked" for registration based upon a quality determination.

10 Claims, 6 Drawing Sheets

(56) References Cited

U.S. PATENT DOCUMENTS

| | | | |
|---|---|---|---|
| 6,876,757 | B2 | 4/2005 | Yau et al. |
| 6,975,922 | B2 | 12/2005 | Duncan et al. |
| 7,007,298 | B1 * | 2/2006 | Shinzaki et al. ............... 726/3 |
| 7,072,855 | B1 | 7/2006 | Godlewski et al. |
| 7,100,792 | B2 | 9/2006 | Hunter et al. |
| 7,155,039 | B1 * | 12/2006 | Lo ............................... 382/124 |
| 7,184,579 | B2 * | 2/2007 | Mizoguchi ................... 382/124 |
| 7,191,238 | B2 * | 3/2007 | Uchida ........................ 709/229 |
| 7,206,437 | B2 | 4/2007 | Kramer et al. |
| 7,218,231 | B2 | 5/2007 | Higham |
| 7,249,688 | B2 | 7/2007 | Hunter et al. |
| 7,272,247 | B2 | 9/2007 | Hamid |
| 7,299,360 | B2 * | 11/2007 | Russo ........................... 713/182 |
| 7,348,884 | B2 | 3/2008 | Higham |
| 7,515,741 | B2 * | 4/2009 | Lo et al. ...................... 382/124 |
| 7,554,449 | B2 | 6/2009 | Higham |
| 7,571,024 | B2 | 8/2009 | Duncan et al. |
| 7,588,167 | B2 | 9/2009 | Hunter et al. |
| 7,634,117 | B2 | 12/2009 | Cho |
| 7,675,421 | B2 | 3/2010 | Higham |
| 7,797,750 | B2 | 9/2010 | Ho et al. |
| 7,835,819 | B2 | 11/2010 | Duncan et al. |
| 7,979,310 | B2 | 7/2011 | Pujar et al. |
| 8,027,749 | B2 | 9/2011 | Vahlberg et al. |
| 8,073,563 | B2 | 12/2011 | Vahlberg et al. |
| 8,126,590 | B2 | 2/2012 | Vahlberg et al. |
| 8,131,397 | B2 | 3/2012 | Vahlberg et al. |
| 8,140,186 | B2 | 3/2012 | Vahlberg et al. |
| 8,155,786 | B2 | 4/2012 | Vahlberg et al. |
| 8,179,543 | B2 * | 5/2012 | Moore ........................ 358/1.14 |
| 8,180,485 | B2 | 5/2012 | Reckelhoff |
| 8,605,959 | B2 * | 12/2013 | Kangas et al. ............... 382/124 |
| 2002/0012455 | A1 | 1/2002 | Benckert |
| 2002/0140542 | A1 * | 10/2002 | Prokoski et al. ............. 340/5.52 |
| 2003/0171998 | A1 | 9/2003 | Pujar et al. |
| 2004/0133705 | A1 | 7/2004 | Broussard et al. |
| 2004/0225409 | A1 | 11/2004 | Duncan et al. |
| 2005/0111709 | A1 * | 5/2005 | Topping ....................... 382/124 |
| 2005/0251687 | A1 * | 11/2005 | Bachinski et al. ........... 713/186 |
| 2006/0022826 | A1 | 2/2006 | Higham |
| 2006/0022827 | A1 | 2/2006 | Higham |
| 2006/0036507 | A1 | 2/2006 | Pujar et al. |
| 2006/0085094 | A1 | 4/2006 | Duncan et al. |
| 2006/0140542 | A1 * | 6/2006 | Koreeda et al. ................ 385/53 |
| 2006/0153432 | A1 * | 7/2006 | Lo et al. ...................... 382/124 |
| 2007/0000937 | A1 | 1/2007 | Hunter et al. |
| 2007/0050272 | A1 | 3/2007 | Godlewski et al. |
| 2007/0140530 | A1 * | 6/2007 | Coogan et al. ............... 382/115 |
| 2007/0188303 | A1 | 8/2007 | Faro et al. |
| 2007/0248249 | A1 | 10/2007 | Stoianov |
| 2007/0285242 | A1 | 12/2007 | Higham |
| 2008/0006647 | A1 | 1/2008 | Hunter et al. |
| 2008/0173713 | A1 | 7/2008 | Higham |
| 2008/0253619 | A1 * | 10/2008 | Hagino et al. ............... 382/115 |
| 2008/0319575 | A1 | 12/2008 | Vahlberg et al. |
| 2008/0319576 | A1 | 12/2008 | Vahlberg et al. |
| 2008/0319577 | A1 | 12/2008 | Vahlberg et al. |
| 2008/0319578 | A1 | 12/2008 | Vahlberg et al. |
| 2008/0319579 | A1 | 12/2008 | Vahlberg et al. |
| 2008/0319580 | A1 | 12/2008 | Vahlberg et al. |
| 2008/0319581 | A1 | 12/2008 | Vahlberg et al. |
| 2008/0319789 | A1 | 12/2008 | Vahlberg et al. |
| 2008/0319790 | A1 | 12/2008 | Vahlberg et al. |
| 2010/0026451 | A1 | 2/2010 | Erhart et al. |
| 2010/0042437 | A1 * | 2/2010 | Levy et al. ...................... 705/3 |
| 2010/0070074 | A1 | 3/2010 | Duncan et al. |
| 2010/0079240 | A1 | 4/2010 | Higham |
| 2010/0198620 | A1 | 8/2010 | Mullenger et al. |
| 2010/0240915 | A1 * | 9/2010 | Jansen et al. ................. 549/506 |
| 2010/0263031 | A1 * | 10/2010 | Tsuchiya ......................... 726/7 |
| 2011/0006724 | A1 | 1/2011 | Reckelhoff |

OTHER PUBLICATIONS

Jain, et al., "An Identity-Authentication System Using Fingerprints," Retrieved from http://biometrocs.cse.msu.edu/Pub;ications/Fingerprint/JainEtAiIldentityAuthUsingFP_ProcIEEE97.pdf on Jun. 28, 2012, Proceedings of the IEEE, Sep. 1997, 24 pages, vol. 85, No. 9.

* cited by examiner

US 9,042,607 B2

SYSTEM AND METHOD FOR USER ACCESS OF DISPENSING UNIT

BACKGROUND OF THE INVENTION

The present invention relates generally to item dispensing, and in particular to systems and methods for managing or controlling user access to a dispensing unit, such as a dispensing unit in a medical or other healthcare facility.

Medical facilities, such as hospitals, use dispensing stations or units to facilitate the delivery of supplies or other items. Such dispensing units may be placed near patients and are designed to hold various supplies and pharmaceuticals needed by those patients. The dispensing units have the ability to control access and maintain records on the number and types of items that are dispensed. For example, a dispensing unit may include a cabinet with a plurality of retractable drawers. Each drawer can be divided into bins, so that more than one type of item may be held within each drawer in order to facilitate the delivery of one or different items to a single patient or to a group of patients in nearby locations. Security may be provided by providing locks on the drawers to allow access to certain users, such a nurses, or allow access to only certain items, or allow access only at certain times of the day.

In order to access items in a dispensing unit, an authorized user may be required to provide authenticating information. Such information may be provided in the form of a user ID/password, data read from a user card, or biometric data (such as by scanning a fingerprint), or some combination of these features.

For example, in the case of fingerprint authentication, a user may first be required to enroll his/her fingerprint. This may be done by the user when first using a dispensing unit, by scanning a fingerprint after entering a user ID and password that has been provided by the administrator of the system. Once the fingerprint is scanned, it is stored in the system as a reference fingerprint and the same user can access the system and dispensing unit in the future after scanning his/her fingerprint, if the scanned fingerprint matches the reference fingerprint.

Using a fingerprint to authenticate a user does present some issues. For example, a user may damage or injure the finger used for the reference fingerprint, and it may not be possible to subsequently get an useable scan of the fingerprint after it has been enrolled. Also, when enrolling it may be difficult for a user to determine which finger is best to use (a preferred finger of the user may provide a fingerprint that may have features that make it difficult to accurately scan or to distinguish from other fingerprints). Also, when a plurality of dispensing units are linked in a network, the scanner at one unit may digitize a scanned fingerprint using a different methodology than another unit scanning the same fingerprint, and thus the units may not be compatible with each other. In such a case, one dispensing unit (e.g., a newer unit using the latest scanning algorithms) may not recognize a fingerprint scanned during enrollment at a different dispensing unit (e.g., an older legacy unit).

BRIEF SUMMARY OF THE INVENTION

There are various embodiments of the invention, in which access to a dispensing unit is provided by requiring a scanned fingerprint from a user.

In one specific embodiment, a dispensing system includes a cabinet having a plurality of storage locations for storing items, a processor for managing access to items stored in cabinet, and a database for storing data representing at least two reference fingerprints associated with each of a plurality of users that request access the cabinet. The stored reference fingerprints are at least a primary fingerprint and an alternate fingerprint. The system also includes a scanner at the cabinet for scanning a finger of a user requesting access to the cabinet. The processor is programmed to receive a scanned fingerprint of the user from a finger that has been scanned at the scanner, to compare the scanned fingerprint to the primary fingerprint stored in the database, and if not a match, to then compare the scanned fingerprint to the alternate finger print stored in the database, and to provide access to the cabinet to the user only if the scanned fingerprint matches one of the stored primary fingerprint and stored alternate fingerprint.

DETAILED DESCRIPTION OF THE INVENTION

Figure 1:
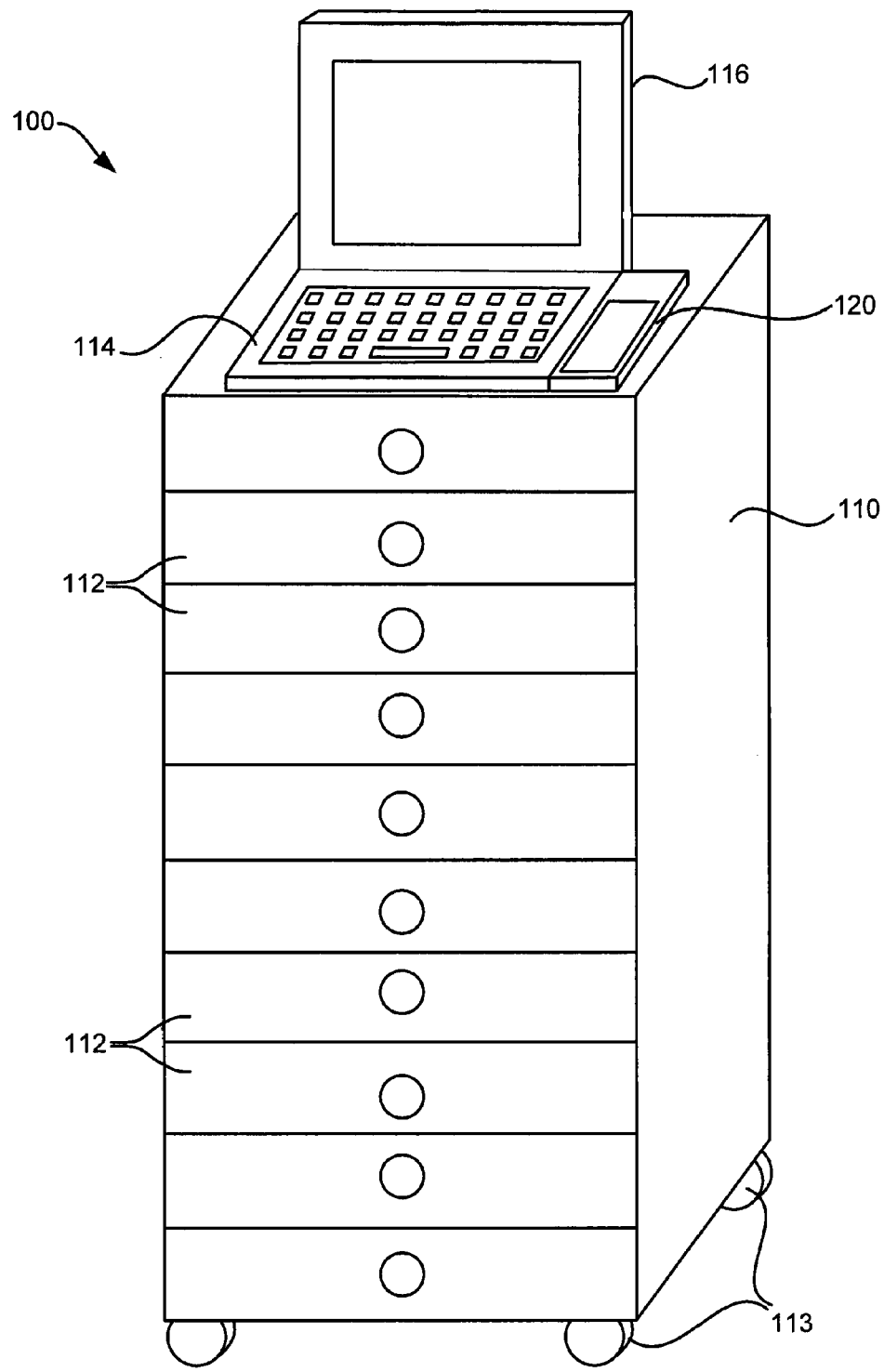
FIG. 1 is a perspective view of an exemplary dispensing unit in accordance with an embodiment of the present invention.

Generally speaking, embodiments of the present invention provide methods and systems relating to dispensing items, such as medical supplies and pharmaceuticals by a nurse or other user within a medical or other healthcare facility. The system may be implemented as a network with a plurality of linked dispensing stations or units.

In described embodiments, security is provided by requiring a fingerprint from a user before granting access. The fingerprint is scanned at the dispensing unit and compared to a reference fingerprint stored within the system at the dispensing unit. Access is granted if the scanned fingerprint matches the reference fingerprint. In one embodiment, a dispensing unit system stores two reference fingerprints from two different fingers (a primary fingerprint and an alternate fingerprint). A user requesting access provides either fingerprint. It some circumstances, a user may be asked to scan a second, alternate fingerprint if the first, primary scanned fingerprint does not match a reference fingerprint, thus minimizing difficulties and delay in access when the first fingerprint cannot be scanned accurately due to injury, damage, skin moisture or other factors affecting the features of the fingerprint.

In other embodiments, in order to use fingerprints for authentication, a user enrolls with the system. During enrollment, the user scans multiple fingerprints (from different fingers), one or more of which are stored in the system as reference fingerprints. The determination of which fingerprint to use as a reference is based on the quality of the scan, including characteristics of the fingerprint that would serve to distinguish it from other fingerprints. In one embodiment, the enrollment takes place at a dispensing unit, with a quality determination made and a quality score assigned to each of the scanned fingerprints, and for the purpose of obtaining both a primary reference fingerprint and an alternate reference fingerprint. After each fingerprint is scanned, if a high quality threshold is achieved from the scan, that fingerprint is used as a reference fingerprint. If the high quality threshold is not achieved, the scan is retained and another fingerprint is scanned. If none of the fingerprints achieve the high quality threshold, then the scanned fingerprints are ranked and the two highest scoring fingerprints are used as the primary and alternate fingerprints. However, in such embodiment, scanning more than two fingers may be eliminated if any two fingerprints meet the high quality threshold. In other words, the first scanned fingerprint that meets the high quality threshold (if any) is used as the primary fingerprint, and the next scanned fingerprint (if any) that meets the high quality threshold is used as the alternate fingerprint. Such an arrangement, referred to herein sometimes as "fast tracking," saves time during enrollment since the user would not need to scan additional fingerprints after two fingerprints have met the high quality threshold. In other embodiments, where only a single reference fingerprint is stored (as opposed to both a primary and an alternate fingerprint), no additional fingerprints would need to be scanned after the first fingerprint meets the high quality threshold.

It should be appreciated that fingerprints are typically not stored and compared in the form of images, but rather in the form of data structures or templates. After a scan is made, the image of the fingerprint may be enhanced using well known algorithms and techniques (e.g., removing extraneous or unnecessary noise or data, reconstructing fingerprint ridges, removing creases and small scars, separating the fingerprint data from background data, and so forth). The enhanced image is then put through an extraction process, which produces screening vectors, fiducial (or reference) points, fingerprint minutiae information, pattern information fields and other data that help uniquely identify the fingerprint. The resulting data is compressed and then used (and stored) as a template. In addition, the quality of the scan may also be assessed using well known techniques and algorithms. In accordance with embodiments herein, data representing assessed quality may likewise be stored with the template, to later determine which templates should be chosen as best suited for use as reference fingerprints.

For convenience, the fingerprint data that is compared and stored for purposes of authentication is generally referred to herein as "a fingerprint," but it should be appreciated that, in the described embodiments, the actual data used for such purposes is a data structure or "template" that is created from a fingerprint image as described above. However, in other alternative embodiments, images or image data may be used rather than data templates derived from fingerprint images.

As mentioned, the algorithms and techniques for creating templates and determining quality are known. As examples only, template creation and quality assessment are described in U.S. Patent Application Publication No. 2007/0248249, filed Mar. 6, 2006 by Stoianov, U.S. Pat. No. 7,634,117, issued Dec. 15, 2009 to Cho, U.S. Pat. No. 7,272,247, issued Sep. 18, 2007 to Hamid, U.S. Pat. No. 7,206,437, issued Apr. 17, 2007 to Kramer et al., U.S. Pat. No. 6,876,757, issued Apr. 5, 2005 to Yau et al., U.S. Pat. No. 6,766,040, issued Jul. 20, 2004 to Catalano et al, and in Tebassi et al, "NIST Fingerprint Image Quality," published by the National Institute of Standards and Technology of the U.S. Department of Commerce (NISTIR 7151, August 2004), each of which is hereby incorporated by reference.

In additional described embodiments, a network of linked dispensing units may include some units that employ one methodology (including a set of algorithms) for creating a template from a scanned fingerprint and other dispensing units that employ a second, different methodology (including a different set of algorithms) for creating a template from a scanned fingerprint. Such an embodiment might arise in an environment where a medical facility employing older (legacy) dispensing units adds new dispensing units in the network, and result in a user being required in some cases to enroll and scan fingerprints at a legacy dispensing unit and in other cases enroll and scan fingerprints at a new dispensing unit, with the legacy and new dispensing units employing different fingerprint methodologies and technology. In one embodiment, dispensing units store and use reference fingerprints scanned at both the legacy units and the new units, so that the user need not enroll separately at legacy dispensing units and at new dispensing units in order to access supplies at each.

Turning now to FIG. 1, there is shown a dispensing unit 100 in accordance with embodiments of the invention. The dispensing unit 100 includes a cabinet 110 having a plurality of retractable drawers 112. The drawers are secured by locks (not shown) which can be opened only when an authorized user is granted access. The drawers may be divided into bins (not show) in order to separate supplies and other items stored within. The specific construction of the drawers 112 can vary depending on the needs of the medical facility in which it is used. One exemplary type of drawer system in a dispensing unit is described in commonly owned U.S. Pat. No. 6,039,467, issued on Mar. 21, 2000 to Holmes, which is hereby incorporated by reference. It should be appreciated that embodiments of the invention are not limited cabinets of the type shown and, in fact, need not employ drawers. For example, the dispensing unit could alternatively use doors, sliding panels or other features for separating and securing items stored therein. Additional types of dispensing units/cabinets are described in commonly owned U.S. Pat. No. 6,272,394, issued on Aug. 7, 2001 to Lipps, U.S. Pat. No. 5,805,456, issued on Sep. 8, 1998 to Higham et al, U.S. Pat. No. 5,745,366, issued on Apr. 28, 1998 to Higham et al., and U.S. Pat. No. 5,905,653, issued on May 18, 1999 to Higham et al., which are also hereby incorporated by reference. The cabinet 110 also includes wheels 113 to permit the dispensing unit to be wheeled to various locations within the medical facility, such as patient rooms or other locations near a patient or near the location where dispensed items might be needed.

The dispensing unit 100 also includes a system having a processor and associated memory devices (generally hidden within cabinet 110 and thus not seen), and various input/output devices linked to the processor. The input/output devices may include a keyboard 114, a display 116, a card reader (not shown) and, in accordance with embodiments herein, a fingerprint scanner 120.

Briefly, in a healthcare environment, the keyboard 114 and display 116 of the dispensing unit 100 might be used to enter and select information (for example, enter a user ID/password, select patient information and medications, and so forth). As will be described in greater detail later, the fingerprint scanner 120 might be used to scan the user fingerprint on a user's finger as part of enrollment and subsequent authentication of the user.

Figure 2:
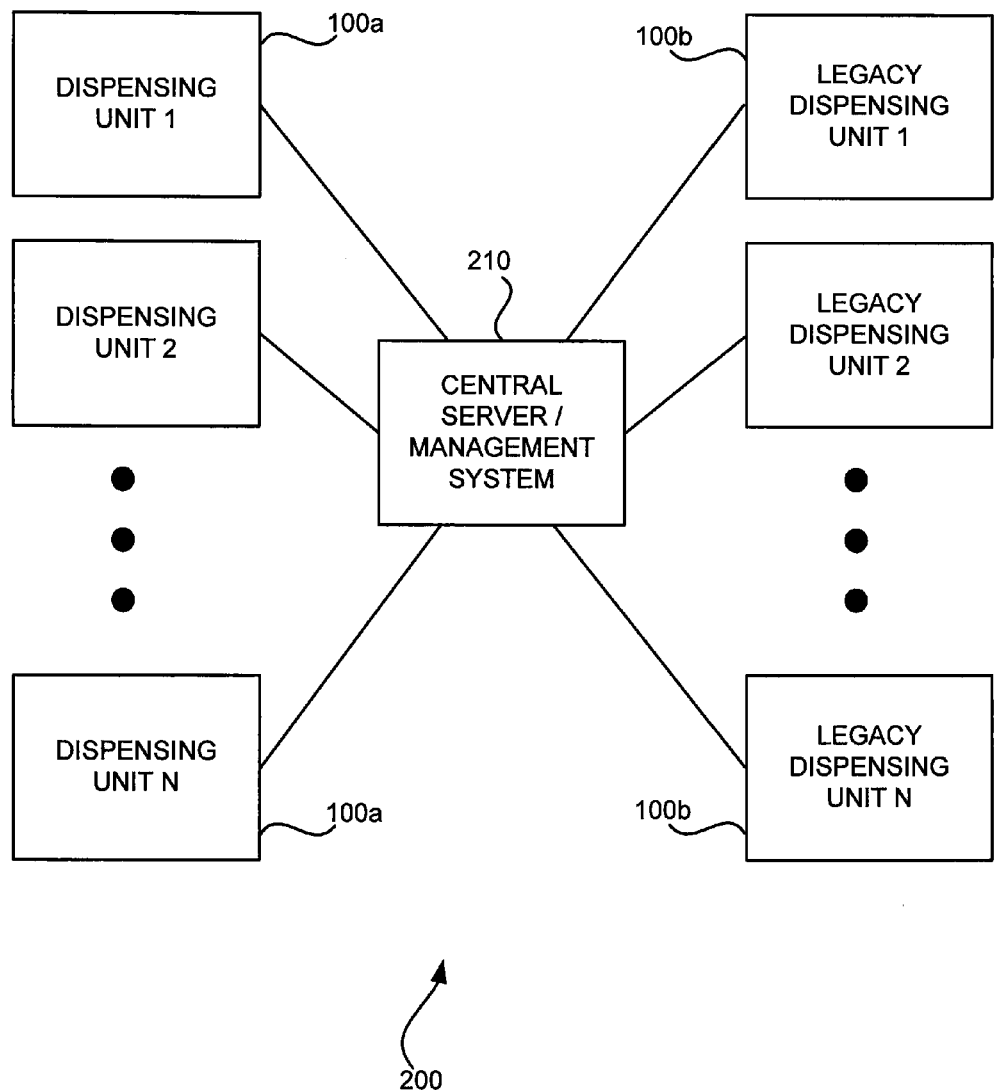
FIG. 2 illustrates a network of dispensing units and a central server system in accordance with an embodiment the present invention.

FIG. 2 illustrates a network 200 in which the dispensing units 100 might be used. As seen, the network 200 includes a plurality of dispensing units 100, including dispensing units 100a (which employ one type of fingerprint technology or algorithms) and dispensing units 100b (which employ a different type of fingerprint technology or algorithms). For purposes of the present description, the actual type of technology/algorithms is not critical, since there are many different commercially available scanning units that employ different technologies, and any two or more of these commercially available scanner systems could be used within the network 200. In one embodiment, the dispensing units 100a are newer units (employing more recent or updated scanner technology) and the dispensing units 100b are older, legacy units that have older scanner technology. In other embodiments, the technology employed at different dispensing units (such as units 100a and 100b) may not be newer versus older, but rather just different from each other.

Also seen in FIG. 2 is a central server/management system 210 to which each of the dispensing units is linked, such as by wireless communications. As will be more fully described later, the central server 210 manages the overall operation of the network 200, including communications between the dispensing units, such as the transmission of user data and fingerprint templates.

Enrollment

As mentioned earlier, in order for a user to be authenticated with fingerprints, in one embodiment it is necessary for the user to enroll with the system. During enrollment, the user scans fingerprints and has one or more useable fingerprints stored as reference fingerprints, for later use in comparison to a fingerprint scanned when a user desires access.

Figure 3:
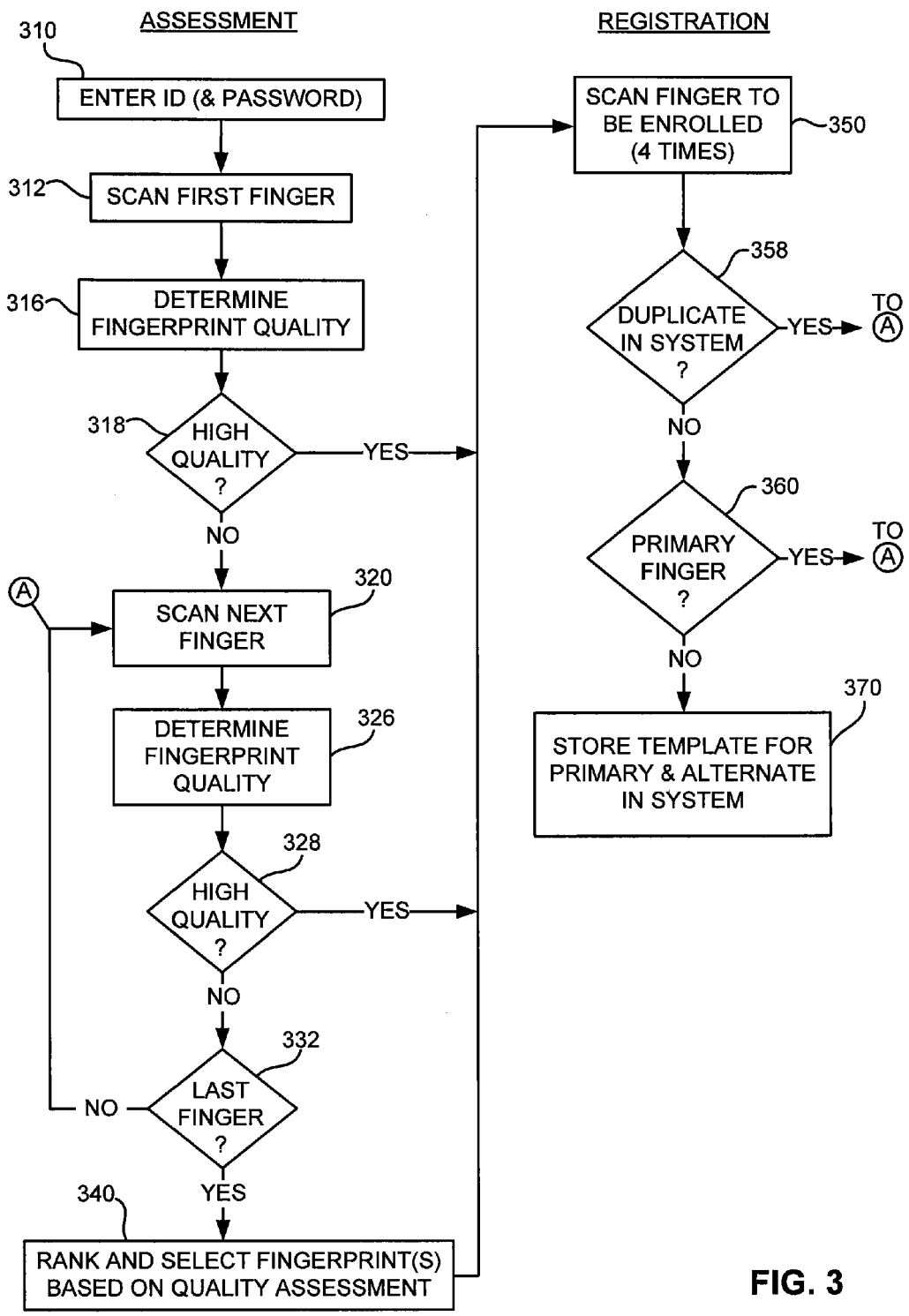
FIG. 3 is a flow diagram of a process for enrolling a user (and the user's fingerprints) for access to the dispensing units in the network of FIG. 2.

One exemplary enrollment process is illustrated in FIG. 3. The process in FIG. 3 is implemented under the programmed control of the processor at the particular dispensing unit 100 where the enrollment takes place. The enrollment process has two major illustrated sub-processes, one being fingerprint "assessment" and the other being fingerprint "registration."

In order to initiate enrollment, the user enters a user ID (and, in one embodiment, for greater security, a password) at the dispensing unit, step 310. Such data could be entered at the keyboard 114. It should be understood that the user will typically have been issued a user ID and password by the system operator/administrator prior to using the dispensing system. In some embodiments a user might enter user data with the use of an encoded user card that is read at the dispensing unit. In most instances, the user will be asked to enroll the first time any dispensing unit 100 is used. However, there might be exceptions, such as when a user decides not to enroll initially but merely use the dispensing system (e.g., in order to quickly access the cabinet with the intent of enrolling later when there is more time). In such a case, the entry of a user ID and password might be all that is required for temporary use of the dispensing station. As another exception, the user might be asked to enroll (or re-enroll) in certain circumstances. Some of these circumstances will be understood from descriptions to follow, but one example might be the use of a newly installed dispensing unit (the user will have previously enrolled at another dispensing unit). If the new dispensing unit employs different scanning technology, and if having fingerprints scanned with the newer technology would be desirable, the user would be asked to enroll at the newly installed dispensing unit in order to register new reference fingerprints for the user.

After entry of a user ID and password at step 310, and assuming the ID and password are valid, the user is requested to scan a first finger, step 312. While the system might be programmed to request a specific finger (and any subsequent fingers) to be scanned, in some embodiments, the user might be permitted to scanned the first finger preferred by the user.

After the finger is scanned, the relevant data from the fingerprint image is extracted (as described earlier) and the resulting fingerprint data (template) is assessed to determine its quality, step 316. The quality of the fingerprint can be determined using any one of many well known techniques. As will be described shortly, the purpose of the quality assessment is to permit a determination of how many fingers might need to be scanned and, in some circumstances, to rank the quality of multiple fingers scanned and choose the highest quality fingerprints of all those scanned to be reference fingerprints.

In the embodiment seen in FIG. 3, the system at the dispensing unit next determines whether the quality of the just scanned fingerprint meets a relatively high threshold level of quality, at step 318. The high threshold level may be determined by the design of the system, but as an example, if each fingerprint is assessed and assigned a quality score on a scale of 0-100 (with 100 being the highest), an example of a high threshold quality level might be a "90," representing a very high quality fingerprint that will give likely rise to very few (if any) false matches or other problems arising from the data extracted from the scanned fingerprint. Of course, an quality scale could take other forms and be far less granular (say a scale of 0-10), and the high threshold could be set at different levels depending on the design of the system. It should be noted that the purpose of determining whether a fingerprint meets the high quality threshold is to permit a fingerprint to be "fast tracked" to registration rather than waiting to be ranked with other fingerprints, thus saving time during the enrollment process. The manner in which a fast tracked fingerprint is registered will be described shortly.

If the first scanned fingerprint is determined not to meet the high quality threshold at step 318, then the user is asked to scan the next finger at step 320. The quality of that fingerprint is assessed at step 326, and a determination is made as to whether that fingerprint meets the high quality threshold at step 328, and if yes, then it is likewise "fast tracked." It should be noted that in the described embodiment two reference fingerprints are to be stored, one being the primary fingerprint (usually, the most likely to be used or the most preferred by the user) and the other being an alternate fingerprint (the next most likely used or preferred). As mentioned earlier, the use of two fingerprints during authentication eliminates problems that might arise when the primary fingerprint is injured, damaged or subject to some other circumstance that might make it difficult to get a scanned fingerprint of sufficient quality or usefulness to compare to a reference fingerprint.

Thus, if the first and second fingers scanned both meet the high quality threshold, no further fingers are scanned. However, if that is not the case, then the system will continue to scan fingers in order to evaluate a sufficient number of fingerprints for quality and choose a fingerprint best suited to be a reference fingerprint. In one exemplary embodiment, absent high quality threshold fingerprints, the system at dispensing unit 100 will request that the user scan six fingers in the following order (or some other predetermined order): right index, right middle, right thumb, left index, left middle, left thumb. Steps 320-328 are repeated for each of those fingers (unless a finger is fast tracked). Once the last finger has been scanned (as determined at step 332), then all of the scanned fingerprints are ranked according to their quality and the best fingerprint is chosen as the reference fingerprint at step 340. If it is the first fingerprint selected, it will be the primary fingerprint (or, as will be described shortly, if the primary fingerprint has already been selected, it will be the alternate fingerprint).

Although not shown in FIG. 3, in one embodiment the ranking and selection of fingerprints at step 340 could include an determination of whether any of the scanned fingerprints fail to meet a minimum level of quality that might be needed to assure reasonable fingerprint authentication of a user. For example, using the quality scale of 0-100 mentioned earlier in conjunction with step 316, if any one of the fingerprints has a quality of 10 or less, that fingerprint would be discarded and not ranked at step 340. If none of the scanned fingerprints meet the minimum quality level, then the enrollment process might stop at step 340 and the user requested to obtain help from the system administrator.

Next, the fingerprint registration sub-process begins at step 350 for any fingerprint that is fast tracked, as well as any other selected fingerprint when only one fingerprint (or no fingerprints) are fast tracked. A fingerprint that has been selected as a reference fingerprint is re-scanned at step 350. In the embodiment shown, the user fingerprint to be registered is scanned for four images at step 350, and the four scans are combined into a composite fingerprint (in order to more likely capture fingerprint characteristics that might be missing from one of more of the scans). The construction of a composite fingerprint from multiple scanned images is well know, and descriptions of how this might be done can be found, for example, in U.S. Patent Application Publication No. 2002/0012455, filed May 11, 2001 by Benckert, U.S. Pat. No. 7,797,750, issued Sep. 14, 2010 to Ho et al., U.S. Pat. No. 6,333,989, issued Dec. 25, 2001 to Borza, and aforementioned U.S. Pat. No. 7,634,117, issued Dec. 15, 2009 to Cho.

The system next checks for duplicate fingerprints, step 358. Duplicates might arise in various circumstances. For example, a user might attempt to register twice (e.g. under different IDs) in order to conceal the user's real identity or to avoid having access to dispensing units attributed to that user. In other, more likely, circumstances, a user may have scanned fingerprint characteristics that are too close to that of another user and appear to be duplicate (and thus not useable to distinguish between users). The system might use various factors to determine if there is suspicious/fraudulent activity (in which case the administrator might be alerted), but otherwise the system may be able to safely assume that there are two users that have fingerprints too similar to each other, and the system returns to step 320 where the user is asked to scan another finger.

If there are no duplicate fingerprints at step 358, then the system determines whether the fingerprint being registered is the primary reference fingerprint, step 360. If it is the primary fingerprint at step 360, the process returns to step 320 in order to scan the next finger (and in order to select and enroll an alternate fingerprint), using steps 326 and 328 (if the next finger meets the high quality threshold), or all of steps 320 through 340 (if the next finger does not meet the high quality threshold). When the process returns to step 360 (and the alternate finger is now being enrolled, i.e., a "no" at step 360), then both the primary and alternate fingerprints are registered and stored as the fingerprint templates in the system at the dispensing unit, step 370.

While not shown in FIG. 3, once the primary and alternate fingerprint templates are registered at the dispensing unit used for enrollment, those templates are in turn sent to the central server 210, and from there sent to each of the other dispensing units 100 (and stored in the local memory at each dispensing unit in network 200) so that the user can be authenticated at any one of the dispensing units using the registered fingerprints.

Also, FIG. 3 illustrates an embodiment of the invention wherein two fingerprints are registered in accordance using one methodology (fingerprint scanning technology) as part of a user enrollment. As mentioned earlier, in some cases the network 200 may have two (or more) different scanning methodologies in place at the dispensing units. In such a case, and in accordance with an alternate embodiment of the invention, the system at the dispensing units where the enrollment takes place may be programmed to use different technologies to scan the fingerprints.

For example, and with further reference to FIG. 2, if only dispensing units 100a were linked in network 210, then all such units could function together using only a single scanning methodology. However, as illustrated in FIG. 2, the legacy dispending units 100b each use a different, older methodology. In order to accommodate the different methodologies, dispensing units 100a each incorporate both newer scanning features (such as registering and storing two different reference fingerprints—primary and alternate) and also the scanning features used by units 100b (which in the disclosed embodiment only scan and store a single reference fingerprint). Thus, in this described embodiment, when a finger is scanned at dispensing units 100a, the units 100a will register both a single fingerprint (using the same methodology as units 100b) and also two fingerprints (primary and alternate) using newer technology features incorporated into units 100a. Both the single reference fingerprint and the two (primary and alternate) referenced fingerprints are stored at units 100a and sent to central server 210, with the single fingerprint in turn sent to the legacy units 100b and the two (alternate and primary) reference fingerprints in turn sent to each of the units 100a (other than, perhaps, the dispensing unit where the enrollment took place). As should be appreciated, this permits a user to be authenticated (using the fingerprints enrolled at one of the units 100a) at either a unit 100a or a unit 100b, based on a single enrollment at one of the units 100a.

Similarly, when a enrollment takes place at one of the units 100b (resulting in a single reference fingerprint), the single reference fingerprint is sent by central servicer 210 to both the units 100a and units 100b. Since the units 100a incorporate the legacy fingerprint scanning technology that is used at the units 100b, the users enrolled at one of the legacy units 100b may be authenticated at one of the units 100a using that single reference fingerprint. In summary, the forgoing features (with units 100a incorporating more than one technology or methodology for fingerprint scanning), maintains compatibility between units 100a and units 100b. As should be appreciated, the just described features could be implemented whenever the units 100a and units 100b use different fingerprint scanning methodologies, regardless of the number of fingerprints that are registered as reference fingerprints at any dispensing unit.

Access

Figure 4:
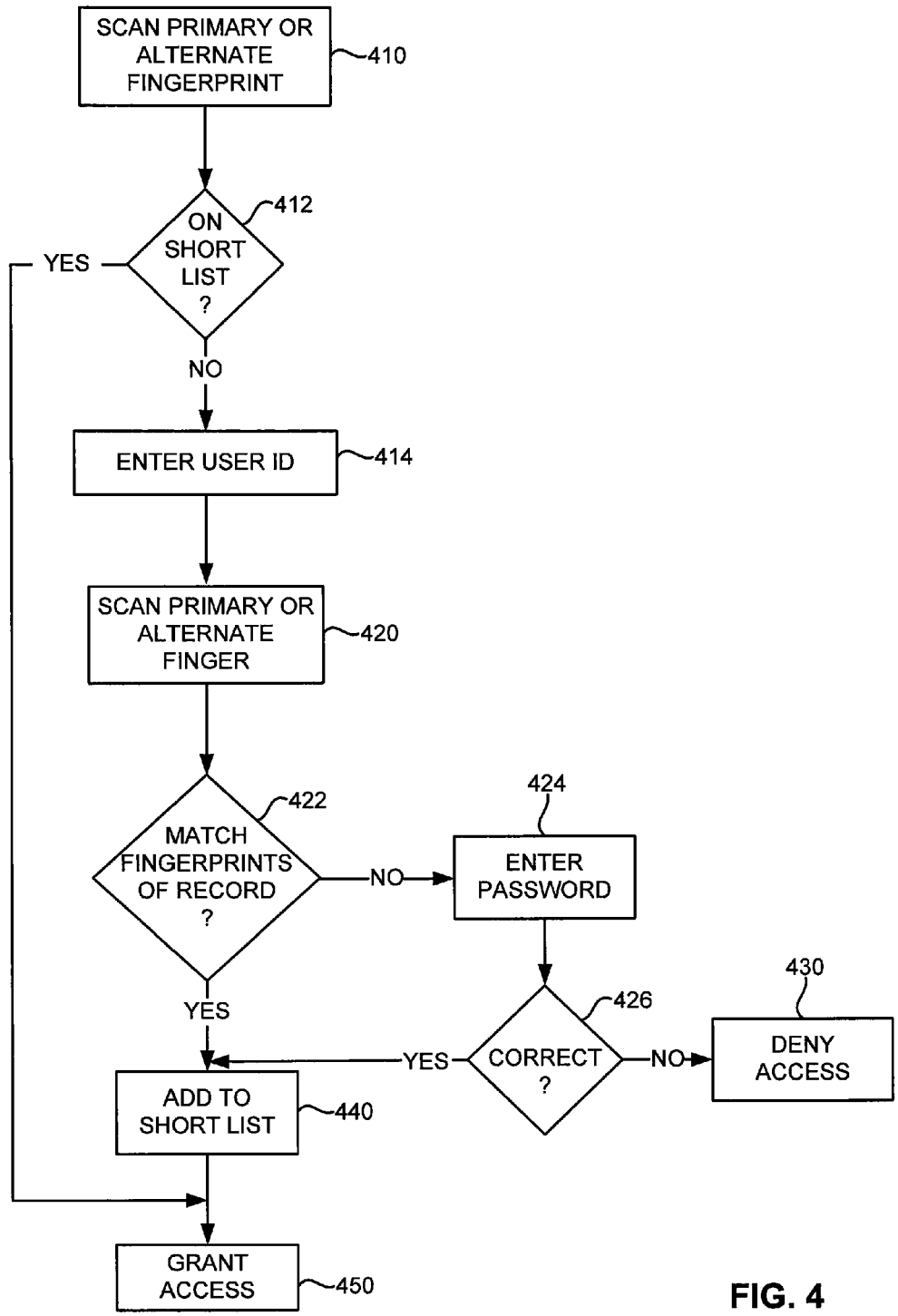
FIG. 4 is a flow diagram illustrating a process for an enrolled user to be granted access to a dispensing unit in the network of FIG. 2.

Turning now to FIG. 4, there is illustrated a process for authenticating a user in order to grant access to one of the dispensing units 100. While the steps are described for accessing one of the units 100a, many of the steps are likewise applicable to authentication at one of the units 100b.

At step 410, the user walks up to the dispensing unit 100a and scans a finger (either a primary finger or alternate finger) at scanner 120. One notable feature of the authentication process is that if the reference fingerprint is on a "shortlist" (to be described shortly), the user need not enter a user ID or any other form of identification. Rather, a recognized fingerprint is all that is needed to identify (and authenticate) the user.

At step 412, the system at the dispensing unit 100a determines whether the fingerprint scanned by the user matches a fingerprint on a "short list." The shortlist is a store of recent reference fingerprints used to successfully authenticate a user. In other words, when a user gains access to a dispensing unit by having a fingerprint scanned and authenticated (after being compared to a reference fingerprint), that fingerprint is added to the "short list" for all the dispensing units in the network 200. In some embodiments, the short list could be specific to certain dispensing units (e.g., if a nurse would not be expected to have reason to access to all cabinets because some might be in a location away from where the nurse has duties) and thus the shortlist fingerprints might not be sent to all of the dispensing units.

The fingerprint will remain on the short list for a predetermined period of time. In one embodiment, a fingerprint is kept on the short list for a period of time corresponding to a user's work shift at the medical facility (e.g., eight hours or some period of time corresponding to an eight hour shift). In other embodiments, the period of time might be longer or shorter. As should be apparent, the short list is designed to permit very rapid and convenient access to one of the dispensing units by someone that had been recently authenticated, by merely scanning a fingerprint and not having to also enter a user ID or some other form of identification along with the fingerprint. However, if the short list is maintained for too long of a period, there might be an increased risk of someone working outside of their normal working hours, or someone with a fingerprint that could be falsely matched with another, gaining improper access to the dispensing cabinet. The operator of the network 200 could use a rules-based model implemented at central server 210 e.g., based on developed guidelines, based on experiential data, or perhaps based on best practices judgment) in determining how long to keep a fingerprint on the short list after it is authenticated, and that model could be programmed into the central system 210 in order to send a command to each of the dispensing units to remove a short list fingerprint after the predetermined period of time has expired.

Returning to FIG. 4, if the fingerprint of the user desiring access is on the short list at step 412, then access is granted, step 450.

If the fingerprint scanned is not on the short list at step 412, then the user is required to enter a user ID (in order to identify the user), step 414, and the user is again required to scan a fingerprint, step 420. In an alternative embodiment, the system might temporarily store the fingerprint scanned at step 410, and use it in lieu of scanning it a second time at step 420. The scanned fingerprint is compared to the reference fingerprint stored at the dispensing unit for the identified user (step 422). If there is a match at step 422, the user is authenticated and the reference fingerprint is added to the short list (step 440) and the user is granted access to the dispensing unit. If there is not a match at step 422, the user is required to enter a password (to authenticate the user apart from the scanned fingerprint), and if the entered password is correct, step 426, the scanned fingerprint is added to the short list (step 440) and the user is granted access at step 450. If the entered password at step 426 is not correct, access to the dispensing unit is denied, step 430.

Figure 5:
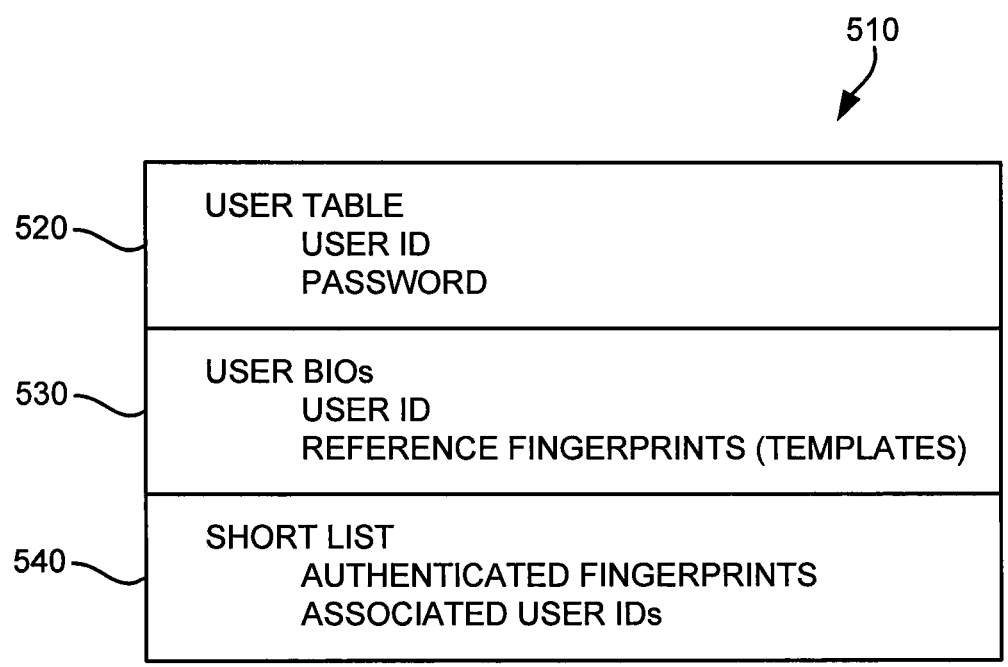
FIG. 5 illustrates user data stored in memory of the system at the dispensing unit seen in FIG. 1.

FIG. 5 illustrates some of the data stored at the local memory 510 at one of the dispensing units 100. As seen, for purposes of implementing the access process seen in FIG. 4, the local memory stores a user table 520, user bios 530 and a short list 540. As mentioned earlier, this data is loaded into dispensing units under the control of the central server 210. The central server adds a user to the user table 520 when the user is first authorized by a system administrator to use the dispensing units.

The user table 520 includes, for each authorized user, a user ID, a user password and any other identifying and personal information (not illustrated) that might be needed at the dispensing unit to carry out its functions.

The user bio 530 for each user includes the reference fingerprints that are stored (either as captured during enrollment at that dispensing unit or as sent from the central server 210 for fingerprints captured at other dispensing units). The user ID for a user is stored in association with reference fingerprints for that user, so that after entering a user ID (e.g., step 414) a scanned fingerprint of that user (step 420) may be compared to the stored reference fingerprint associated with that user (step 422). The reference fingerprints include in some embodiments (as mentioned earlier) fingerprint templates using methodologies employed at both the units 100*a* and 100*b*.

Thus, in the embodiment described in conjunction with FIG. 2, the user bios 530 at each dispensing unit 100*a* (e.g., newer technology units, that can scan fingerprints using both new and old technology), have both new technology reference fingerprints (primary and alternate reference fingerprints) and a single legacy reference fingerprint for each user. The user bios 530 at each dispensing unit 100*b* (e.g., older technology units) have only a single legacy reference fingerprint.

The shortlist 540 at the local memory 510 maintains reference fingerprints for any user recently authenticated (with a scanned fingerprint) at any dispensing unit, and stores the reference fingerprint in association with the user ID for the authenticated user. As mentioned earlier, the reference fingerprint for any user is removed from the shortlist after a predetermined period time.

Figure 6:
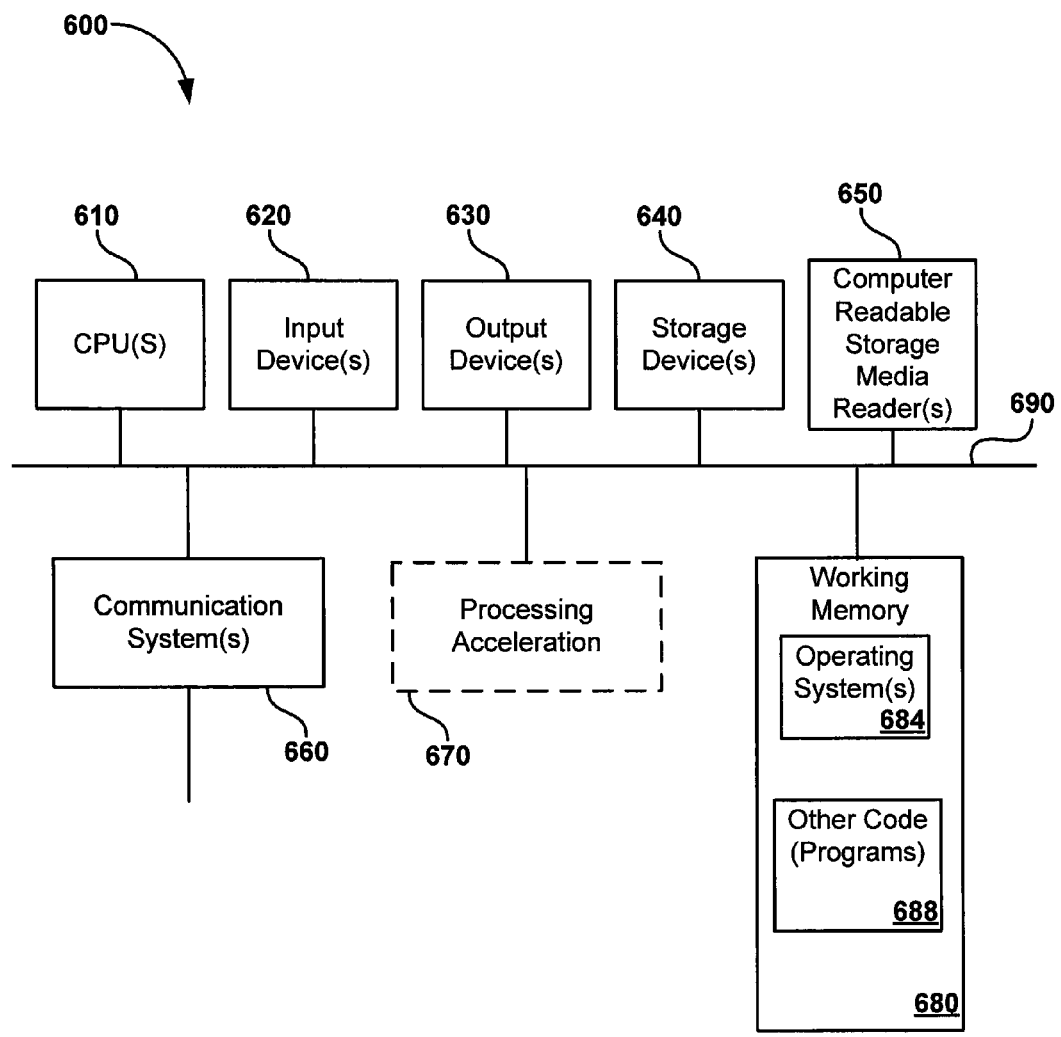
FIG. 6 is a block diagram illustrating an exemplary computer system upon which embodiments of the present invention may be implemented.

FIG. 6 is a block diagram illustrating an exemplary computer system upon which embodiments of the present invention may be implemented. This example illustrates a computer system 600 such as may be used, in whole, in part, or with various modifications, to provide the functions of the system at dispensing units 100 and the central server 210, as well as other components and functions of the invention described herein.

The computer system 600 is shown comprising hardware elements that may be electrically coupled via a bus 690. The hardware elements may include one or more central processing units 610, one or more input devices 620 (e.g., a mouse, a keyboard, scanner, etc.), and one or more output devices 630 (e.g., a display device, a printer, etc.). The computer system 600 may also include one or more storage devices 640, representing remote, local, fixed, and/or removable storage devices and storage media for temporarily and/or more permanently containing computer-readable information, and one or more storage media reader(s) 650 for accessing the storage device(s) 640. By way of example, storage device(s) 640 may be disk drives, optical storage devices, solid-state storage device such as a random access memory ("RAM") and/or a read-only memory ("ROM"), which can be programmable, flash-updateable or the like.

The computer system 600 may additionally include a communications system 660 (e.g., a modem, a network card—wireless or wired, an infra-red communication device, a Bluetooth™ device, a near field communications (NFC) device, a cellular communication device, etc.) The communications system 660 may permit data to be exchanged with a network, system, computer, mobile device and/or other component as described earlier. The system 600 also includes working memory 680, which may include RAM and ROM devices as described above. In some embodiments, the computer system 600 may also include a processing acceleration unit 670, which can include a digital signal processor, a special-purpose processor and/or the like.

The computer system 600 may also comprise software elements, shown as being located within a working memory 680, including an operating system 684 and/or other code 688. Software code 688 may be used for implementing functions of various elements of the architecture as described herein. For example, software stored on and/or executed by a computer system, such as system 600, can be used in implementing the process seen in FIGS. 3 and 4.

It should be appreciated that alternative embodiments of a computer system 600 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the system at dispensing units 100 and the central server 210 may each be implemented by a single system having one or more storage device and processing elements. As another example, the units 100 and central server 210 may each be implemented by plural systems, with their respective functions distributed across different systems either in one location or across a plurality of linked locations.

Moreover, while the various flows and processes described herein (e.g., those illustrated in FIGS. 3 and 4) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Further, the term "exemplary" used herein does not mean that the described example is preferred or better than other examples. Consequently, although the invention has been described with respect to exemplary embodiments, it will be appreciated that the invention is intended to cover all modifications and equivalents within the scope of the following claims.

What is claimed is:

1. A dispensing system, comprising:
   a cabinet having a plurality of storage locations for storing items;
   a processor for managing access to items stored in the cabinet;
   a database for storing data representing at least two reference fingerprints associated with each of a plurality of users that request access to the cabinet, the two stored fingerprints including at least a primary fingerprint and an alternate fingerprint; and
   a scanner at the cabinet for scanning a finger of a user requesting access to the cabinet,
   wherein the processor is programmed to receive a scanned fingerprint of the user from a finger that has been scanned at the scanner, to compare the scanned fingerprint to the primary fingerprint stored in the database, and if not a match, to then compare the scanned fingerprint to the alternate fingerprint stored in the database, and to provide access to the cabinet if the scanned fingerprint matches one of the stored primary fingerprint and stored alternate fingerprint,
   wherein a user ID is stored in the database, wherein the processor is further programmed to receive a user ID entered by the user at the cabinet, to compare the entered user ID to the stored user ID and to provide access to the cabinet if both (1) the stored user ID matches the entered user ID and (2) the scanned fingerprint matches one of the stored reference fingerprints, and
   wherein the processor is further programmed to also store data for at least one of the two reference fingerprints at the database as a shortlist fingerprint, if the scanned fingerprint matches one of the stored primary fingerprint and the stored alternate fingerprint, and for subsequent requests for access, to compare a subsequently scanned fingerprint of the user to the stored shortlist fingerprint, and to provide access to the cabinet, without entry of a user ID, if the subsequent scanned fingerprint matches the stored shortlist fingerprint.

2. The system of claim 1, wherein the processor is programmed to store the shortlist fingerprint for a predetermined period of time, and then after the predetermined period of time remove the shortlist fingerprint from the database.

3. The system of claim 2, wherein the predetermined period of time is related to the working hours of the user with whom the shortlist fingerprint is associated.

4. A dispensing system, comprising:
   a cabinet having a plurality of storage locations for storing items;
   a processor for managing access to items stored in the cabinet;
   a database for storing data representing at least two reference fingerprints associated with each of a plurality of users that request access to the cabinet, the two stored fingerprints including at least a primary fingerprint and an alternate fingerprint; and
   a scanner at the cabinet for scanning a finger of a user requesting access to the cabinet,
   wherein the processor is programmed to receive a scanned fingerprint of the user from a finger that has been scanned at the scanner, to compare the scanned fingerprint to the primary fingerprint stored in the database, and if not a match, to then compare the scanned fingerprint to the alternate fingerprint stored in the database, and to provide access to the cabinet if the scanned fingerprint matches one of the stored primary fingerprint and stored alternate fingerprint,
   wherein the processor enrolls a user by scanning multiple fingerprints and then storing at least one of the multiple fingerprints as a reference fingerprint at the database, and wherein during enrollment the processor is further programmed to:
   determine the quality of a first fingerprint of the multiple fingerprints after it is scanned;

if the quality of the first fingerprint meets a predetermined level of quality, designate the first fingerprint as a reference fingerprint;

if the quality of the first fingerprint fails to meet the predetermined level of quality, request the user scan a second fingerprint of the multiple fingerprints;

determine the quality of the second fingerprint of the multiple fingerprints after it is scanned;

if the quality of the second fingerprint meets the predetermined level of quality, designating the second fingerprint as a reference fingerprint;

if neither the first fingerprint nor second fingerprint meets the predetermined level of quality, scan at least a third fingerprint of the multiple fingerprints;

if none of the scanned first, second and third fingerprints meets the predetermined level of quality, rank each of the scanned multiple fingerprints according to the quality of each; and designate the one of the first, second and third fingerprints having the highest quality rank as one of the two reference fingerprints.

5. The system of claim 4, wherein a user ID and user password are stored in the database, and wherein the processor, prior to enrolling the user by scanning multiple fingerprints, is programmed to receive a user ID and password entered by the user and to enroll that user only if the entered user ID and user password match the stored user ID and user password.

6. The system of claim 4, wherein the processor is further programmed to determine if any scanned multiple fingerprints fails to meet a minimum level of quality prior to ranking each of the scanned multiple fingerprints, and if any one of the scanned multiple fingerprints fails to meet the minimum level of quality, to discard and not rank any one of the scanned multiple fingerprints that fails to meet the minimum level of quality.

7. The system of claim 5, wherein the quality of each fingerprint is based on a scale of 0-100, and wherein the predetermined level of quality is at a value 80 on the scale.

8. The system of claim 7, wherein the minimum level of quality is at a value of 10 on the scale.

9. The system of claim 1, wherein the system includes a plurality of cabinets, a plurality of processors, and a plurality of databases, each of the processors and databases associated with one of the cabinets, wherein the cabinet is a first cabinet, and wherein the processor is a first processor associated with the first cabinet, wherein the first processor is further programmed to receive both a primary fingerprint and an alternate fingerprint scanned at the scanner, and to store both the primary fingerprint and alternate fingerprint at its associated database as reference fingerprints in order to enroll a user for accessing the first cabinet, wherein a second processor associated with a second cabinet is further programmed to scan one fingerprint, and to store the one fingerprint at its associated database as a reference fingerprint in order to enroll a user for accessing the second cabinet, wherein the first processor is further programmed to store, at its associated database, the one fingerprint scanned at the second cabinet if the primary fingerprint and alternate fingerprint have not been scanned at the first cabinet, and wherein the second processor is programmed to store, at its associated database, the primary fingerprint scanned at the first cabinet as a reference fingerprint if the primary fingerprint and alternate fingerprint have been scanned at the first cabinet.

10. The system of claim 1, wherein the cabinet comprises a plurality of retractable drawers having storage locations, and wherein the drawers are locked unless access is provided by the processor.

* * * * *